United States Patent [19]

Sugioka et al.

[11] Patent Number: 4,822,972
[45] Date of Patent: Apr. 18, 1989

[54] BEARING COOLING APPARATUS OF HEATING ROLLER

[75] Inventors: Takami Sugioka; Shigeru Naoki; Toshiyuki Ueno, all of Matsuyama, Japan

[73] Assignee: Teijin Seiki Co., Ltd., Osaka, Japan

[21] Appl. No.: 19,130

[22] Filed: Feb. 26, 1987

[30] Foreign Application Priority Data

Mar. 3, 1986 [JP] Japan ............................ 61-30305[U]

[51] Int. Cl.⁴ ............................................. H05B 6/14
[52] U.S. Cl. .......................... 219/10.492; 219/10.61 A; 165/122; 165/104.33
[58] Field of Search ...................... 165/122, 47, 104.33; 219/469, 10.61 A, 10.492; 310/60 R, 62, 63

[56] References Cited

U.S. PATENT DOCUMENTS 3,226,580 12/1965 Oehlrich et al. .................. 310/60 R
3,484,581 12/1969 Bliss ...................................... 219/469
3,601,968 8/1971 Wirz .............................. 219/10.61 A

FOREIGN PATENT DOCUMENTS 17737 7/1943 Japan .
1172587 12/1969 United Kingdom ........ 219/10.61 A Primary Examiner—Albert W. Davis, Jr.
Attorney, Agent, or Firm—Cushman, Darby & Cushman

[57] ABSTRACT

A bearing cooling apparatus of a heating roller wherein the heating roller includes a roller, heating means disposed inside the roller, and a shaft having the roller mounted thereon, comprising a housing having the shaft rotatably supported thereto by bearings attached to the housing and formed with a first passageway and a second passageway, and means for circulating a cooling medium through the first and second passageways. At least one of the first and second passageways extends along the bearing disposed adjacent the heating means and along the shaft and are disposed adjacent the bearing and the shaft.

9 Claims, 6 Drawing Sheets

BEARING COOLING APPARATUS OF HEATING ROLLER

FIELD OF THE INVENTION

The present invention relates in general to a bearing cooling apparatus of a heating roller and in particular to a bearing cooling apparatus of a heating roller which is employed in the heating process of a yarn-like material or a sheet-like material such as film or the like. More specifically, the present invention relates to a bearing cooling apparatus of a heating roller which is employed in the spin draw process of thermosetting synthetic fiber or in the spinning process, etc., of thermosetting synthetic fiber.

SUMMARY OF THE INVENTION

In accordance with one important aspect of the present invention, there is provided a bearing cooling apparatus of a heating roller wherein the heating roller includes a roller, heating means disposed inside the roller, and a shaft having the roller mounted thereon, comprising a housing having the shaft rotatably supported thereto by bearings attached to the housing and formed with a first passageway and a second passageway, at least one of the first and second passageways extending along the bearing disposed adjacent the heating means and along the shaft and being disposed adjacent the bearing and the shaft, and means for circulating a cooling medium through the first and second passageways.

In accordance with another important aspect of the present invention, there is provided a bearing cooling apparatus of a heating roller wherein the heating roller includes a roller, heating means disposed inside the roller, and a shaft having the roller mounted thereon, comprising a housing having the shaft rotatably supported thereto by bearings attached to the housing and formed with a first passageway and a second passageway, a cooling fin mounted on the shaft between the roller and the bearing disposed adjacent the heating means, at least one of the first and second passageways extending along the bearing disposed adjacent the heating means and along said shaft and along the cooling fin and being disposed adjacent the bearing, said shaft and the cooling fin, and means for circulating a cooling medium through the first and second passageways.

In accordance with another important aspect of the present invention, there is provided a bearing cooling apparatus of a heating roller wherein the heating roller includes a rotatable roller, a heating coil disposed inside the rotatable roller, a cylindrical core having the heating coil wound therearound, and a rotatable shaft having the rotatable roller mounted thereon, comprising a housing having the rotational shaft of the heating roller rotatably supported thereto by bearings attached to the housing and formed with a first passageway passing therethrough, an annular flange having the cylindrical core attached thereto and formed with a second passageway passing therethrough, the annular flange being attached to the housing, a cooling fin mounted on the rotational shaft between the bearing disposed adjacent the heating coil and the rotatable roller, and a partition wall extending axially from the annular flange along the rotational shaft and along the bearing disposed adjacent the heating coil and terminating short of the cooling fin so that a third passageway is defined by the housing, the partition wall and the cooling fin and a fourth passageway is defined by the cylindrical core, the partition wall and the cooling fin, the third passageway being held at one end thereof in fluid communication with the first passageway and at the other end thereof with one end of the fourth passageway, the other end of the fourth passageway being held in fluid communication with the second passageway, and means for circulating a cooling medium through the first, second, third and fourth passageways.

In accordance with another important aspect of the present invention, there is provided a bearing cooling apparatus of a heating roller wherein the heating roller includes a rotatable roller, a heating coil disposed inside the rotatable roller, a cylindrical core having the heating coil wound therearound, and a rotatable shaft having the rotatable roller mounted thereon, comprising a housing having the rotational shaft of the heating roller rotatably supported thereto by bearings attached to the housing and formed with a first passageway passing therethrough, an annular flange having the cylindrical core attached thereto and formed with a second passageway passing therethrough, the annular flange being attached to the housing, a cooling fin mounted on the rotational shaft between the bearing disposed adjacent the heating coil and the roller so that the first passageway is held in fluid communication with the second passageway, and means for circulating a cooling medium through the first and second passageways.

In accordance with another important aspect of the present invention, there is provided a bearing cooling apparatus of a heating roller wherein the heating roller includes a rotatable roller, a heating coil disposed inside the rotatable roller, a cylindrical core having the heating coil wound therearound, and a rotatable shaft having the rotatable roller mounted thereon, comprising a housing having the rotational shaft of the heating roller rotatably supported thereto by bearings attached to the housing and formed with a first passageway, a flange portion of the cylindrical core being attached to the housing to define a second passageway therebetween, an axial pump mounted on the rotational shaft between the bearing disposed adjacent the heating coil and the rotatable roller, and a partition wall integrally formed in the housing and axially extending therefrom along the bearing disposed adjacent the heating coil and along the rotational shaft and terminating short of the axial pump so that a third passageway is defined by the housing, the partition wall and the axial pump and a fourth passageway is defined by the cylindrical core, the partition wall and the axial pump, the third passageway being held at one end thereof in fluid communication with the first passageway and at the other end thereof with one end of the fourth passageway, the other end of the fourth passageway being held in fluid communication with the second passageway, mechanical seals disposed between the housing and the axial pump and between the cylindrical core and the axial pump to hermetically seal the third passageway and the fourth passageway, respectively, and means for circulating a cooling medium through the first, second, third and fourth passageways.

In accordance with another important aspect of the present invention, there is provided a bearing cooling apparatus of a heating roller wherein the heating roller includes a rotatable roller, a heating coil disposed inside the rotatable roller, a cylindrical core having the heating coil wound therearound, and a rotatable shaft having the rotatable roller mounted thereon, comprising a housing having the rotational shaft of the heating roller rotatably supported thereto by bearings attached to the housing, the cylindrical core attached to the housing and formed with a first passageway and a second passageway which are held at one ends thereof in fluid communication with each other, a cooling fin mounted on the rotational shaft between the bearing disposed adjacent the heating coil and the rotatable roller, at least one of the first and second passageways extending along the bearing disposed adjacent the heating means and along the cooling fin and being disposed adjacent the bearing and the cooling fin, and means for circulating a cooling medium through the first and second passageways.

DESCRIPTION OF THE PRIOR ART

In a conventional heating roller of the type, which is employed in the spin draw process and the like of thermosetting synthetic fiber, the heating roller is driven by drive means such as, for example, an electric motor. In general, the heating roller is mounted directly on a shaft of the electric motor, or mounted on a shaft coupled through a coupling member to the shaft of the electric motor, in consideration of the resonance point and strength of the shaft which are dependent upon operating temperatures, thread speeds, denier numbers and the like. Such a heating roller is provided with heating means such as, for example, a heater element, an induction coil, etc, and in order to rotatably support the shaft of the heating roller, a bearing is disposed inside or adjacent the heating roller. For this reason, the bearing is heated to a considerably higher temperature of the order of 150° C. by heat transferred to the bearing through the shaft from the heating means and by radiation of the heating means. As a consequence of the high temperature, the bearing is damaged and the lubrication oil therefor is degraded.

Hence, in order to prevent the damage of the bearing and the degradation of the lubricating oil, there have been proposed heretofore various kinds of bearing cooling apparatuses of the aforementioned heating roller. In the conventional bearing cooling apparatuses of these kinds, the bearing is cooled by circulating a cooling water therearound through a cooling water pipe by means of a circulation system. However, only an outer race of the bearing is cooled and the shaft of the heating roller having an inner race of the bearing mounted thereon is not cooled. The temperature difference therefore becomes large between the inner race and the outer race of the bearing. For this reason, the bearing is unduly deformed and damaged due to the difference between thermal expansions of the inner and outer races, and the lubricating oil is degraded.

Accordingly, it is the object of the present invention to provide an improved bearing cooling apparatus of a heating roller which prevents damage of the bearing and degradation of the lubricating oil which are caused by the temperature difference between the outer and inner races. The object is achieved according to the present by defining a passageway for a cooling medium disposed adjacent and extending along the shaft of the heating roller and the bearing so that the shaft and the bearing are cooled at the same time.

BRIEF DESCRIPTION OF THE DRAWINGS

The features and advantages of a bearing cooling apparatus according to the present invention will be more clearly understood from the following description taken in conjunction with the accompanying drawings in which like reference numerals designate corresponding or similar members and structures throughout the figures of the drawings and in which.

DESCRIPTION OF THE PREFERRED EMBODIMENTS

Figure 1:
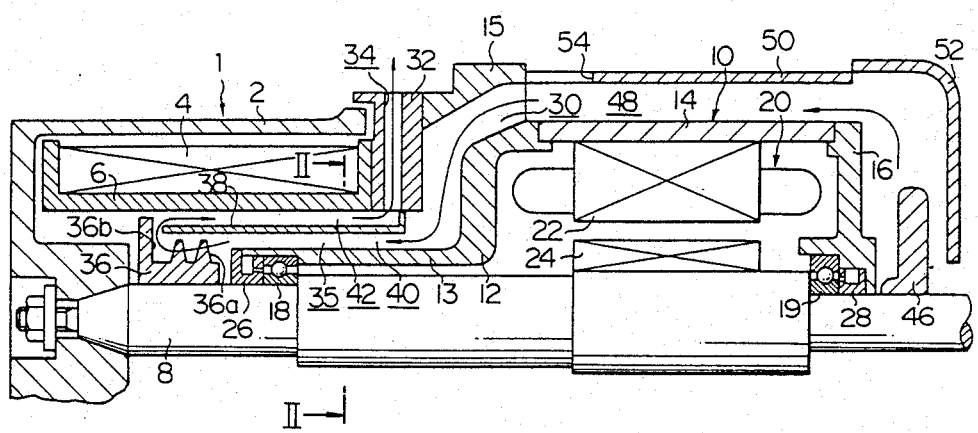
FIG. 1 is a cross sectional view showing a first embodiment constructed in accordance with the present invention.

Referring initially to FIG. 1 of the drawings, a heating roller of a first embodiment according to the present invention is designated generally by reference numeral 1. The heating roller 1 comprises a rotatable cylindrical roller 2, an electromagnetic induction heating coil 4 disposed as heating means inside the cylindrical roller 2, a cylindrical core 6 having the electromagnetic induction heating coil 4 wound therearound, and a rotational shaft 8 received at its one end in a central bore formed in a boss portion of the roller 2 and attached to the roller 2 by suitable fastening means. The rotational shaft 8 extends from the boss portion of the cylindrical roller 2 through the cylindrical core 6 and through a cylindrical motor housing 10 including a front housing 12, a rear housing 14 and an end plate 16. The front housing 12, rear housing 14 and end plate 16 are connected together in assembled relationship. The rotational shaft 8 is rotatably supported at its forward portion by a bearing 18 attached to an axially extending portion 13 of the front housing 12 and at its rearward portion by a bearing 19 attached to the end plate 16. A motor generally indicated by reference numeral 20 is disposed as drive means inside the motor housing 10 and adapted to drive the heating roller 1 to rotate about the rotational shaft 8. The motor 20 comprises a stator 22 attached to the rear housing 14 and a rotor 24 attached to the rotational shaft 8. The bearing 18 attached to the front housing 12 is lubricated by a lubrication nozzle 26 arranged adjacent the bearing 18. Likewise, the bearing 19 attached to the end plate 16 is lubricated by a lubrication nozzle 28 arranged adjacent the bearing 19.

The front housing 12 of the motor housing 10 further has a radial portion 15 extending radially outward from the axial portion 13. The radial portion 15 is formed with a first inlet passageway 30 passing therethrough to take in a cooling medium for cooling the bearing 18 disposed adjacent the electromagnetic induction heating coil 4 of the heating roller 1. In this embodiment, it will be assumed that the cooling medium is a cooling air. The front housing 12 includes an annular flange 32 attached to the radial portion 15 of the front housing 12. The annular flange 32 extends radially inward from the outer end of the radial portion 15 of the front housing 12 and terminates short of the axial portion 13 of the front housing 12 as shown. The annular flange 32 is formed with a first outlet passageway 34 passing therethrough to discharge the cooling air. A flange portion of the aforementioned cylindrical core 6 is attached to the annular flange 32 so that an axially extending annular bore 35 is defined by the inner peripheral surface of the cylindrical portion of the cylindrical core 6, the inner peripheral surface of the annular flange 32, the outer peripheral surface of the axial portion 13 of the front housing 12 and a portion of the rotational shaft 8.

A cooling fin 36 is mounted on the rotational shaft 8 of the heating roller 1 adjacent the bearing 18 so that heat to be transferred to the rotational shaft 8 from the roller 2 is extracted through the cooling fin 36 by a cooling air. The cooling fin 36 has an axial portion with thread-like cooling fin portions 36a to induce the flow of a cooling air and increase the generating surface thereof, and has a flange portion 36b. The flange portion 36b of the cooling fin 36 extends radially outward from the axial portion of the cooling fin 36 into the axially extending annular bore 35 so that the cooling air in the axial annular bore 35 cannot go beyond the flange portion 36b.

Figure 2:
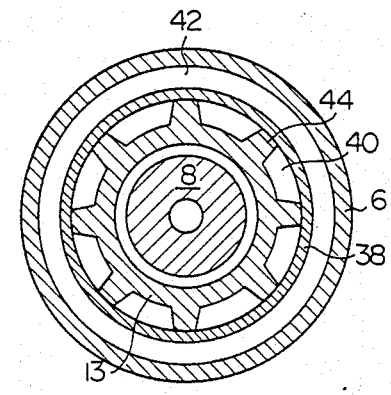
FIG. 2 is a cross sectional view taken substantially along line II—II of FIG. 1.

A cylindrical partition wall 38 is attached to the annular flange 32 and axially extends in the axial annular bore 35 along the rotational shaft 8 to divide the axial bore 35 into a second inlet passageway 40 defined by the inner peripheral surface of the partition wall 38, the outer peripheral surface of the axial portion 13 of the front housing 12 and the cooling fin 36, and a second outlet passageway 42 defined by the outer peripheral surface of the partition wall 38, the inner peripheral surface of the cylindrical core 6 and the cooling fin 36. The partition wall 38 terminates short of the flange portion 36b of the cooling fin 36 so that the second inlet passageway 40 is held at one end thereof in communication with the second outlet passageway 42. The other end of the second inlet passageway 40 communicates with the first inlet passageway 30 formed in the radial portion 15 of the front housing 12. Similarly, the second outlet passageway 42 communicates with the first outlet passageway 34 formed in the annular flange 32. The partition wall 38 also serves to intercept the flow of radiation of the heating coil 4 directly from the inner peripheral surface of the cylindrical core 6 to the cooling fin 36, rotational shaft 8 and bearing 18. As shown in FIG. 2, the axial portion 13 of the front housing 12 is formed with a plurality of equiangularly spaced parallel fin portions 44 to increase a generating surface of the front housing 12. In this embodiment, although the partition wall 38 is not provided with fin portions, it is noted that it may be provided at its outer peripheral portion with fin portions to increase the generating surface thereof.

Returning to FIG. 1, a cooling fan 46 is mounted on the rearward portion of the rotational shaft 8 extending from the end plate 16 of the motor housing 10 in order to take in the cooling air from the outside. In this embodiment, althouth the cooling air is taken in, it is noted that a cooling air under pressure may be used in place of the cooling fan 46. An introduction passageway 48 is defined by a housing cover 50 attached to the radial portion 15 of the front housing 12 and by a fan cover 52 attached to the housing cover 50. The introduction passageway 48 is circumferentially divided into a plurality of chambers by a plurality of axially extending parallel fin portions provided in the rear housing 14 of the motor housing 10. Some of the axial parallel chambers are communicated with the first inlet passageway 30 in the front housing 12, while the remaining chambers are communicated with a discharge port 54 formed in the housing cover 50. A cooling air is drawn in the introduction passageway 48 by the cooling fan 46 and supplied in part through some of the axial parallel chambers to the first inlet passageway 30 and discharged in part through the remaining axial chambers from the discharge port 54 after heat is extracted from the motor 20 through the fin portions of the rear housing 14. Thus, in this embodiment, the fin portions are provided in the introduction passageway 48 so that the introduction passageway 48 is divided into a plurality of the chambers, thereby increasing the generating surface and a cooling effect.

Figure 3:
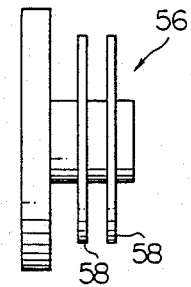
FIG. 3 illustrates one modification of a cooling fin shown in FIG. 1.

FIG. 3 illustrates a cooling fin 56 which is one modification of the cooling fin 36 shown in FIG. 1. The cooling fin 56 is substantially identical in operation and construction to the cooling fin 36 of FIG. 1, but characterized in that the axial portion of the cooling fin 56 has mounted thereon a plurality of disc-like fin portions 58 each extending radially outward.

Figure 4:
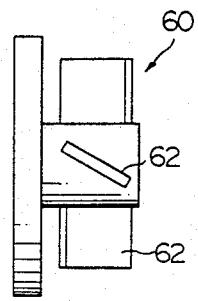
FIG. 4 illustrates another modification of the cooling fin shown in FIG. 1.

FIG. 4 illustrates a cooling fin 60 which is another modification of the cooling fin 36 shown in FIG. 1. The cooling fin 56 is substantially identical in operation and construction to the cooling fin 36 of FIG. 1, but characterized in that the axial portion of the cooling fin 60 has mounted thereon a plurality of plate-like fin portions 62 each extending at a predetermined angle with respect to the rotational shaft 8. It is noted that the plate-like fin portions 62 may extend axially in parallel relation with the rotational shaft 8 of the heating roller 1.

The operation of the aforementioned first embodiment constructed in accordance with the present invention will hereinafter be described in detail.

As the heating roller 1 is driven to rotate through the rotational shaft 8 by the motor 20, the cooling fan 46 rotates together with the rotational shaft 8. The rotation of the cooling fan 46 causes the cooling air to be drawn inside the fan cover 52 from the outside. The cooling air passes in part through some of the chambers in the introduction passageway 48, extracting the heat generated in the motor 20 through the fin portions formed in the rear housing 14, and is discharged from the discharge port 54 of the housing cover 50. The cooling air passing through the remaining chambers is supplied to the first inlet passageway 30 of the front housing 12. The cooling air in the first inlet passageway 30 passes through the second inlet passageway 40 while extracting the heat transferred to the bearing 18 from the outer race of the bearing through the fin portions 44 of the front housing 12 and at the same time extracting the heat transferred to the rotational shaft 8 through the thread-like fin portions 36a of the cooling fin 36. Thus, since the rotational shaft 8 is also cooled by the cooling air, the heat to be transferred to an inner race of the bearing 18 through the rotational shaft 8 is considerably reduced. As a consequence, the outer and inner races of the bearing 18 are simultaneously cooled by the cooling air passing through the second inlet passageway 40. The cooling air is then discharged through the second outlet passageway 42 and through the first outlet passageway 34. While the cooling air is passing through the second outlet passageway 42, the heat to be transferred from the inner peripheral surface of the cylindrical core 6 directly to the shaft 8 and the bearing 18 is intercepted by the partition wall 38 and also the inner peripheral surface of the core 6 is always cooled by the cooling air passing through the second outlet passageway 42. Therefore, the heat to be transferred directly to the bearing 18 is also prevented by the partition wall 38 and the cooling air passing through the second outlet passageway 42.

Thus, in this embodiment of the present invention, the cooling air supplied by the cooling fan 46 cools the bearing 18 and the rotational shaft 8 concurrently while passing through the second inlet and outlet passageways 40 and 42. As a consequence, the temperature of the bearing 18 falls to the order of, for example, 80° C. and the temperature difference does not occur between the outer and inner races of the bearing 18. Accordingly, the damage of the bearing 18 and the degradation of the lubricating oil of the bearing 18 are prevented. Thus, since the desired cooling effect is achieved by the simply constructed passageways, the whole assembly of the apparatus according to the present invention becomes structurally simple, small in size and less expensive.

Although it has been illustrated and described that the axial portion 13 of the front housing 12 is formed with the fin portions 44, it is noted that it is not always necessary to provide the fin portions in the second inlet passageway 40. Also, although it has been illustrated and described that the axial portion of the cooling fin 36 is formed with thread-like fin portions 36b, disc-like fin portions 58 or plate-like fin portions 62, it is noted that it is not always necessary to provide the fin portions.

Figure 5:
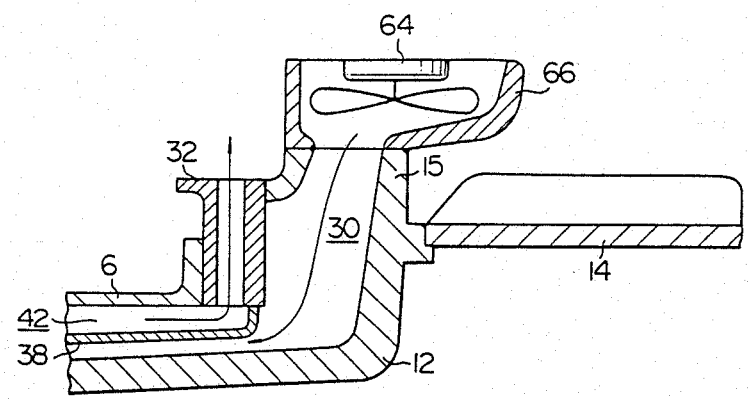
FIG. 5 is a cross sectional view, partly broken away, showing a second embodiment constructed in accordance with the present invention, a cooling fan shown in FIG. 1 being provided in a front housing.

Referring to FIG. 5, there is shown a second embodiment according to the present invention. This embodiment is substantially identical in construction and operation to the first embodiment described above, except that a cooling fan 64 and a fan casing 66 attached to the radial portion 15 of the front housing 12 are provided to draw a cooling air directly in the first inlet passageway 30 formed in the radial portion 15 of the front housing 12. The portions substantially identical in operation and construction to those of the first embodiment are designated by like reference numerals and therefore the description will hereinafter be omitted. It is noted that means for drawing a cooling air in the first inlet passageway is not limited to the cooling fan 64 of this embodiment and that a cooling air under pressure may be supplied to the first inlet passageway by fluid compressing means in stead of the cooling fan 64. This is applicable to all the embodiments herein described. Also, although the cooling fan 64 is provided in the inlet passageway, it is noted that the cooling air may be drawn from the outlet passageway by means of fans or blowers to pass through the inlet and outlet passageways.

Figure 6:
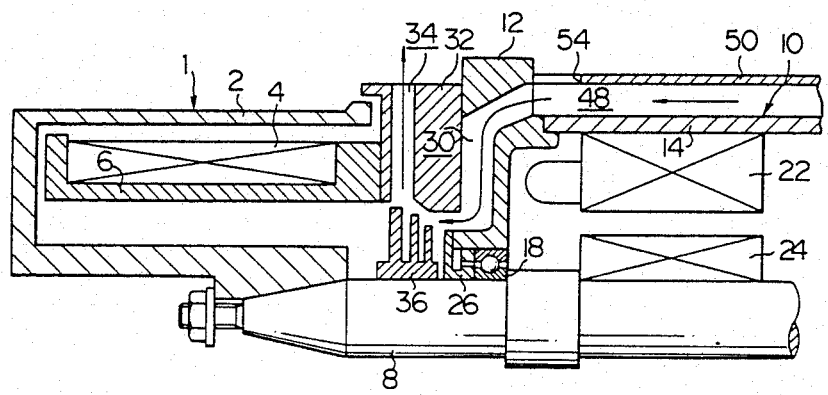
FIG. 6 is a cross sectional view, partly broken away, showing a third embodiment constructed in accordance with the present invention, a cooling fin and a bearing shown in FIG. 1 being disposed outside a cylindrical core.

FIG. 6 depicts a third embodiment constructed in accordance with the present invention. The portions substantially identical in operation and construction to those of the first embodiment of FIG. 1 are designated by like reference numerals. In this embodiment, the portion of a rotational shaft 8 extending through a cylindrical core 6 is shortened so that a bearing 18 and a cooling fin 36 are disposed outside the cylindrical core 6. In addition, the partition wall 38 shown in FIG. 1 is not provided in the third embodiment. Thus, the cooling air in an inlet passageway 30 formed in a front housing 12 is discharged through the cooling fin 36 from an outlet passageway 34 formed in an annular flange 32 attached to the front housing 12. The other constructions and operations are substantially identical to those of the first embodiment of FIG. 1 and therefore the description will hereinafter be omitted.

Figure 7:
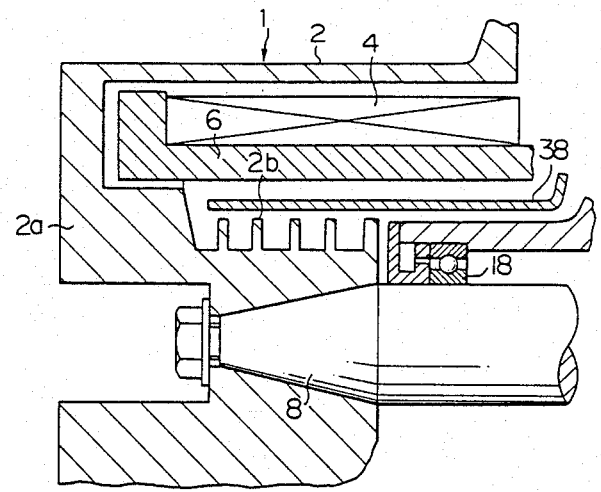
FIG. 7 is a cross sectional view, partly broken away, showing a fourth embodiment constructed in accordance with the present invention, the cooling fin shown in FIG. 1 being displaced with cooling fin portions formed in a boss portion of a rotatable roller.

FIG. 7 illustrates a fourth embodiment embodying the present invention. The portions substantially identical in operation and construction to those of the first embodiment of FIG. 1 are designated by like reference numerals. The fourth embodiment of the present invention is characterized in that the cooling fin 36 of the first embodiment of FIG. 1 is replaced with a boss portion 2a of the roller 2 of the heating roller 1 which is integrally formed with a plurality of cooling fin portions 2b. The other constructions and operations are substantially identical to the first embodiment of FIG. 1 and therefore the description will hereinafter be omitted. It should be noted that the cooling fin portions 2b may be of disc-like configuration shown in FIG. 3 and of plate-like configuration shown in FIG. 4.

Figure 8:
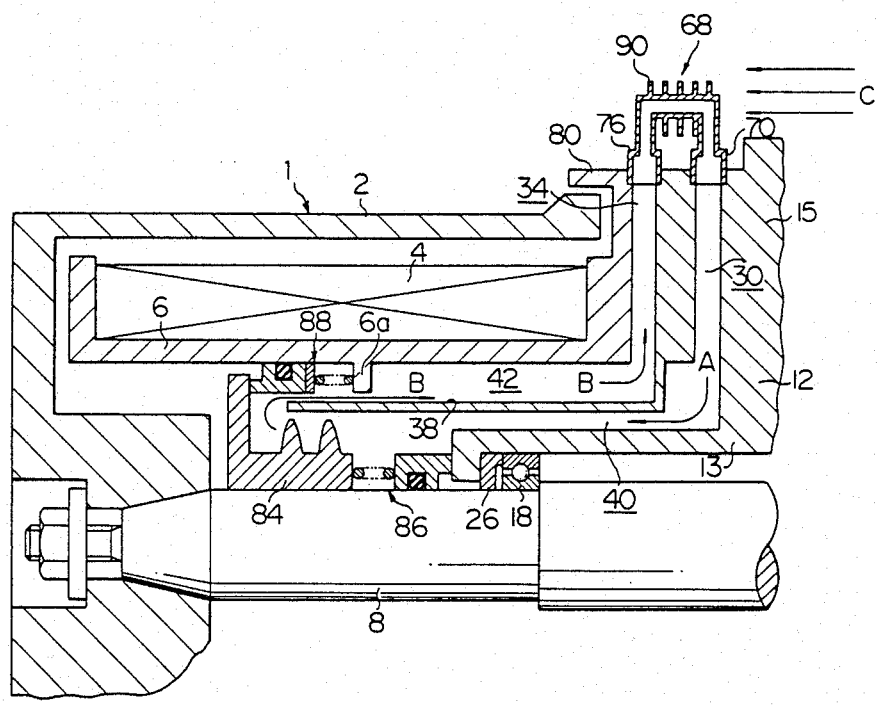
FIG. 8 is a cross sectional view, partly broken away, showing a fifth embodiment constructed in accordance with the present invention, mechanical seals being provided to hermetically seal inlet and outlet passageways for a cooling liquid medium.

Referring to FIG. 8, there is shown a bearing cooling apparatus of a heating roller, which is constructed in accordance with a fifth embodiment of the present invention. In the fifth embodiment, it is assumed that a cooling medium for cooling a bearing disposed adjacent the heating roller is a liquid. The portions substantially identical in operation and construction to those of hhe first embodiment of FIG. 1 are indicated by like reference numerals. In FIG. 8, a radiator generally designated by reference numeral 68 is provided which comprises an inlet nozzle 70 held in fluid communication with a first inlet passageway 30 formed in a radial portion 15 of a front housing 12, and an outlet nozzle 76 held in fluid communication with a first outlet passageway 34 defined by a flange portion 80 of a cylindrical core 6 and the radial portion 15 of the front housing 12. In this embodiment, the cooling fin 36 of the first embodiment shown in FIG. 1 is replaced with an axial pump 84 which is driven by rotation of a rotational shaft 8. As the axial pump 84 is driven to rotate, the cooling liquid medium in the radiator 68 passes, as indicated by an arrow A, from the inlet nozzle 70 through the first inlet passageway 30 and through a second inlet passageway 40 defined by a partition wall 38 of the front housing 12, an axial portion 13 of the front housing 12 and the axial pump 84, and returns, as indicated by arrows B, through a second outlet passageway 42 defined by the partition wall 38, the cylindrical portion of the cylindrical core 6 and the axial pump 84. The second inlet passageway 40 is sealed by a mechanical seal 86 disposed between the boss portion of the axial pump 84 and the axial end of an axial portion 13 of the front housing 12 so that the cooling liquid medium in the inlet passageway 40 is prevented from leaking in the shaft side. Similarly, the second outlet passageway 42 is sealed by a mechanical seal 88 disposed between the flange portion of the axial pump 84 and a lug portion 6a formed in the cylindrical core 6 so that the cooling liquid medium in the outlet passageway 42 is prevented from leaking in the heating coil side. The aforementioned radiator 68 is formed with a plurality of radiator fin portions 90 to radiate heat while the cooling liquid medium is passing through the radiator 68. A cooling air is passed through the radiator fin portions 90, as indicated by arrows C, by a cooling fan provided therefor. Thus, heat is forcibly radiated from the cooling liquid medium through the radiator fin portions 90. The heat can be naturally radiated depending upon the outside temperature of the radiator 68 and upon the flow condition in the vicinity of the radiator 68. The other constructions and operations are substantially identical to the first embodiment of FIG. 1 and therefore the description will hereinafter be omitted.

Figure 9:
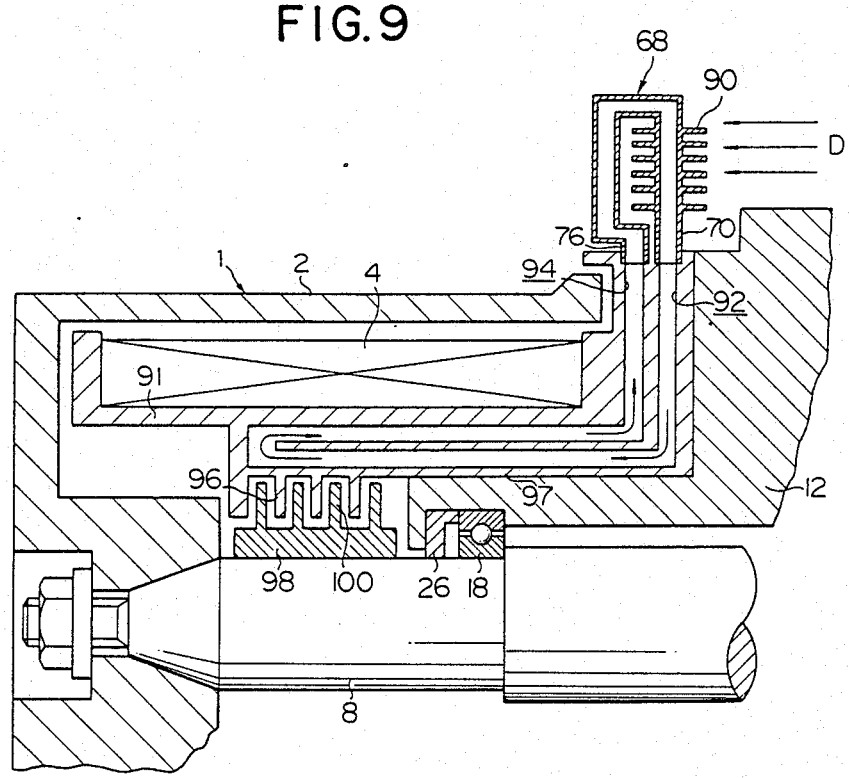
FIG. 9 is a cross sectional view, partly broken away, showing a sixth embodiment constructed in accordance with the present invention, the inlet and outlet passageways for a cooling liquid medium being formed in a core having a heating coil wound therearound.

FIG. 9 shows a sixth embodiment of the present invention similar to the fifth embodiment of FIG. 8 in that a cooling liquid medium is also applicable as a cooling medium to this embodiment. The sixth embodiment is characterized in that a core 91 having an electromagnetic induction heating coil 4 wound therearound is formed with an inlet passageway 92 and an outlet passageway 94 through which the cooling liquid medium circulates a radiator 68 and in that the mechanical seals 86 and 88 of the fifth embodiment shown in FIG. 8 are omitted. The portions substantially identical in construction and operation to those of the fifth embodiment of FIG. 8 are designated by like reference numerals.

The inlet passageway 92 is held in fluid communication at one end thereof with an inlet nozzle 70 of the radiator 68 and at the other end thereof with one end of the outlet passageway 94. The other end of the outlet passageway 94 is held in fluid communication with an outlet nozzle 76 of the radiator 68. The cooling liquid medium in the radiator 68 is naturally passed through the inlet and outlet passageways 92 and 94 and returned to the radiator 68 by heat generated in the electromagnetic induction heating coil 4 and by radiation of the radiator 68. It should be noted that the cooling liquid medium may be forcibly circulated by suitable circulation means provided in these passageways. The core 91 is further formed with a plurality of cooling plate portions 96 at a portion 97 thereof with which the inlet passageway 92 is formed. The cooling plate portions 96 are axially spaced apart with one another and extend radially inward toward a rotational shaft 8. On the rotational shaft 8 is mounted a cooling fin 98 formed with a plurality of cooling fin portions 100 each extending radially outward between the adjacent cooling plate portions 96 of the core 91. Thus, the cooling plate portions 96 of the core 91 and the cooling fin portions 100 of the cooling fin 98 are alternately spaced apart with one another. Accordingly, the inner and outer races of a bearing 18 mounted on the rotational shaft 8 are cooled at the same time through the rotational shaft 8, the cooling plate portions 96 of the core 91 and the cooling fin portions 100 of the cooling fin 98 while the cooling liquid medium is passing through the inlet passageway 92 of the core 91. As described above in the fifth embodiment, a cooling air is passed through radiator fin portions 90 of the radiator 68, as indicated by arrows D, by a cooling fan provided therefor. Thus, heat is forcibly radiated from the cooling liquid medium through the radiator fine portions 90. The heat can be naturally radiated depending upon the outside temperature of the radiator 68 and upon the flow condition in the vicinity of the radiator 68. The other constructions and operations are substantially identical to the first embodiment of FIG. 1 and therefore the description will hereinafter be omitted.

From the foregoing description regarding the second embodiment to sixth embodiment of the present invention, it will be seen that these embodiments also can obtain the same effect that is obtained by the first embodiment.

Although it has been described that the electromagnetic induction heating coil 4 is used as heating means for heating the rotatable roller 2, it is noted that a heat medium such as, for example, steam and the like may be used as heating means. Although the present invention has been illustrated and described in conjunction with a cooling air or cooling liquid medium, it is noted that it may be also applied to other types of cooling fluid or a fluid cooled by suitable cooling means. Also, while it has been illustrated that the rotatable roller 2 is mounted directly on the rotational shaft 8, it is noted that it may be mounted on a shaft which is coupled to the rotational shaft 8. Furthermore, although the rotational shaft, bearing and bearing cooling apparatus are disposed inside the heating roller, it is noted that the present invention may be applied to the reverse arrangement. Furthermore, although it has been described that the inlet passageway is arranged inside and the outlet passageway is arranged outside, it is noted that the arrangement may be reversed.

In accordance with the present invention, inlet and outlet passageways for a cooling medium are arranged between the heating roller and the means for circulating the cooling medium, and at least one of the inlet and outlet passageways extends along the bearing disposed adjacent the heating means and along the shaft and are disposed adjacent the bearing and the shaft. The bearing and the shaft are therefore cooled at the same time and the generating surface is increased. Furthermore, at least more than one fluid layer is provided between the heating roller and the bearing and therefore the adiabatic and radiation effect is increased. Thus, there is provided, according to the present invention, an improved bearing cooling apparatus of a heating roller which prevents damage of the bearing and degradation of the lubricating oil which are caused by the temperature difference between the outer and inner races.

While certain representative embodiments and details have shown for the purpose of illustrating the present invention, it will be apparent to those skilled in this art that various changes and modifications may be made therein without departing from the spirit or scope of the invention.

What we claim is:

1. A bearing cooling apparatus of a heating roller wherein said heating roller includes a rotatable roller, a heating coil disposed inside said rotatable roller, a cylindrical core having said heating coil wound therearound, and a rotatable shaft having said rotatable roller mounted thereon, comprising a housing having said rotational shaft of said heating roller rotatably supported thereto by bearings attached to said housing and formed with a first passageway passing therethrough, an annular flange having said cylindrical core attached thereto and formed with a second passageway passing therethrough, the annular flange being attached to said housing, a cooling fin mounted on said rotational shaft between said bearing disposed adjacent said heating means and said rotatable roller, and a partition wall extending axially from said annular flange along said rotational shaft and along said bearing disposed adjacent said heating coil and terminating short of said cooling fin so that a third passageway is defined by said housing, said partition wall and said cooling fin and a fourth passageway is defined by said cylindrical core, said partition wall and said cooling fin, the third passageway being held at one end thereof in fluid communication with said first passageway and at the other end thereof with one end of said fourth passageway, the other end of said fourth passageway being held in fluid communication with said second passageway, and means for circulating a cooling medium through said first, second, third and fourth passageways.

2. A bearing cooling apparatus as set forth in claim 1, wherein said housing has an axial portion extending along said rotational shaft, the axial portion being formed with a plurality of cooling fin portions.

3. A bearing cooling apparatus as set forth in claim 1, wherein said cooling fin is formed with thread-like cooling fin portions.

4. A bearing cooling apparatus as set forth in claim 1, wherein said cooling fin is formed with a plurality of disc-like fin portions each extending radially outward.

5. A bearing cooling apparatus as set forth in claim 1, wherein said cooling fin is formed with a plurality of plate-like fin portions each extending at a predetermined angle with respect to said rotational shaft of said heating roller.

6. A bearing cooling apparatus as set forth in claim 1, wherein said cooling fin is formed with a plurality of plate-like fin portions each extending axially in parallel relation with said rotational shaft of said heating roller.

7. A bearing cooling apparatus as set forth in claim 1, wherein said means for circulating a cooling medium comprises a cooling fan mounted on said rotational shaft of said heating roller.

8. A bearing cooling apparatus as set forth in claim 1, wherein said means for circulating a cooling medium comprises a cooling fan attached to said housing.

9. A bearing cooling apparatus of a heating roller wherein said heating roller includes a rotatable roller, a heating coil disposed inside said rotatable roller, a cylindrical core having said heating coil wound therearound, and a rotatable shaft having said rotatable roller mounted thereon, comprising:

a housing having said rotational shaft of said heating roller rotatably supported thereto by bearings attached to said housing and formed with a first passageway passing therethrough, an annular flange having said cylindrical core attached thereto and formed with a second passageway passing therethrough, the annular flange being attached to said housing, a radially extending member mounted on said rotatable shaft, and a partition wall extending axially from said annular flange along said rotational shaft and along said bearing disposed adjacent said heating coil and terminating short of said radially extending member so that a third passageway is defined by said housing, said partition wall and said radially extending member and a fourth passageway is defined by said cylindrical core, said partition wall and said radially extending member, the third passageway being held at one end thereof in fluid communication with said first passageway and at the other end thereof with one end of said fourth passageway through said radially extending member, the other end of said fourth passageway being held in fluid communication with said second passageway, and means for circulating a cooling medium through said first, second, third and fourth passageways.

* * * * *